(12) United States Patent
Kim et al.

(10) Patent No.: US 12,495,291 B2
(45) Date of Patent: Dec. 9, 2025

(54) METHOD AND APPARATUS FOR SUPPORTING PLURALITY OF SIMS IN NEXT-GENERATION MOBILE COMMUNICATION SYSTEM

(71) Applicant: Samsung Electronics Co., Ltd., Suwon-si (KR)

(72) Inventors: Sangbum Kim, Suwon-si (KR); Anil Agiwal, Suwon-si (KR); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 317 days.

(21) Appl. No.: 18/014,267

(22) PCT Filed: Jun. 30, 2021

(86) PCT No.: PCT/KR2021/008218
§ 371 (c)(1),
(2) Date: Jan. 3, 2023

(87) PCT Pub. No.: WO2022/010162
PCT Pub. Date: Jan. 13, 2022

(65) Prior Publication Data
US 2023/0262446 A1    Aug. 17, 2023

(30) Foreign Application Priority Data
Jul. 8, 2020 (KR) .................. 10-2020-0083829

(51) Int. Cl.
H04W 8/20 (2009.01)
H04W 76/30 (2018.01)
H04W 88/06 (2009.01)

(52) U.S. Cl.
CPC ............. *H04W 8/20* (2013.01); *H04W 76/30* (2018.02); *H04W 88/06* (2013.01)

(58) Field of Classification Search
CPC ... H04W 88/06; H04W 60/005; H04W 76/28; H04W 8/20; H04W 76/30
See application file for complete search history.

(56) References Cited

U.S. PATENT DOCUMENTS 10,623,946 B1 * 4/2020 Kumar .................. H04W 76/16
2013/0150013 A1   6/2013 Liu et al.
(Continued)

FOREIGN PATENT DOCUMENTS

KR    10-2013-0066531 A    6/2013
WO    2021-029730 A1       2/2021

OTHER PUBLICATIONS

Extended European Search Report dated Oct. 24, 2023; European Appln. No. 21838421.2-1215/4164310 1 PCT/KR2021008218.
(Continued)

*Primary Examiner* — Dung Hong
(74) *Attorney, Agent, or Firm* — Jefferson IP Law, LLP

(57) ABSTRACT

The present disclosure relates to a communication technique for converging IoT technology with a 5G communication system for supporting a higher data transfer rate beyond the 4G system, and a system therefor. The present disclosure may be applied to intelligent services (for example, smart homes, smart buildings, smart cities, smart cars or connected cars, healthcare, digital education, retail businesses, security- and safety-related services, etc.) on the basis of 5G communication technology and IoT-related technology.

14 Claims, 16 Drawing Sheets

(56) References Cited

U.S. PATENT DOCUMENTS

| | | | |
|---|---|---|---|
| 2015/0373671 A1* | 12/2015 | Yang | H04W 60/005 |
| | | | 455/450 |
| 2016/0302114 A1* | 10/2016 | Jain | H04W 36/304 |
| 2017/0094589 A1* | 3/2017 | Bhasin | H04W 48/18 |
| 2017/0257858 A1* | 9/2017 | Jain | H04W 72/23 |
| 2018/0042014 A1 | 2/2018 | Wu et al. | |
| 2022/0240213 A1* | 7/2022 | Ly | H04W 60/04 |
| 2022/0264587 A1* | 8/2022 | Zhang | H04W 72/1215 |
| 2023/0047213 A1* | 2/2023 | Chen | H04W 74/002 |

OTHER PUBLICATIONS

Qualcomm Incorporated et al., 'Solution for scheduling gap', S2-2004711, 3GPP SA WG2 #139E, Elbonia, Jun. 14, 2020.
VIVO, 'Report of phase 1 Multi-SIM email discussion', RP-191898, 3GPP TSG-RAN WG #85, Newport Beach, USA, Sep. 9, 2019.
Motorola Mobility et al., 'Solution for MT service delivery when multiple USIMs are registered in the same serving PLMN', S2-19011355, 3GPP SA WG2 #136, Reno, USA, Nov. 8, 2019.
European Office Action dated Aug. 1, 2025, issued in European Patent Application No. 21838421.2.

* cited by examiner

METHOD AND APPARATUS FOR SUPPORTING PLURALITY OF SIMS IN NEXT-GENERATION MOBILE COMMUNICATION SYSTEM

TECHNICAL FIELD

The disclosure relates to an operation of a terminal and a base station in a mobile communication system.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post long term evolution (LTE) system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multipoints (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed components such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

DISCLOSURE OF INVENTION

Technical Problem

If a terminal uses a plurality of SIMs, there is a problem that paging, system information, and PWS information transmitted from a second network cannot be received.

Further, when the terminal reselects a cell with a different TA, a connection to the network is required in a process of re-registering a paging area. In this case, the terminal needs a transmission and reception process with the network. However, when the terminal uses a plurality of SIMs, the terminal cannot perform a TAU operation according to whether other networks are transmitted or received.

Solution to Problem

According to an embodiment of the disclosure, a method performed by a terminal supporting a plurality of subscriber identity modules (SIMs) in a wireless communication system may include determining switching to a second network corresponding to a second SIM in a state connected to a first network corresponding to a first SIM, transmitting, to a first base station of the first network, a first message including periodic gap information, receiving, from the first base station, a second message including a gap configuration based on the periodic gap information, and stopping data transmission and reception between the terminal and the first base station and performing a standby mode operation for the second network based on the gap configuration.

According to an embodiment of the disclosure, a terminal supporting a plurality of subscriber identity modules (SIMs) in a wireless communication system may include a transceiver, and a controller configured to determine switching to a second network corresponding to a second SIM in a state connected to a first network corresponding to a first SIM, to control the transceiver to transmit a first message including periodic gap information to a first base station of the first network, to control the transceiver to receive, from the first base station, a second message including gap configuration based on the periodic gap information, and to stop data transmission and reception between the terminal and the first base station and to perform a standby mode operation for the second network based on the gap configuration.

Advantageous Effects of Invention

According to an embodiment of the disclosure, a terminal and a base station can support a plurality of SIMs.

MODE FOR THE DISCLOSURE

In the following description, in describing the disclosure, in the case that it is determined that a detailed description of a related well-known function or constitution may unnecessarily obscure the gist of the disclosure, a detailed description thereof will be omitted. Hereinafter, an embodiment of the disclosure will be described with reference to the accompanying drawings.

Figure 1:
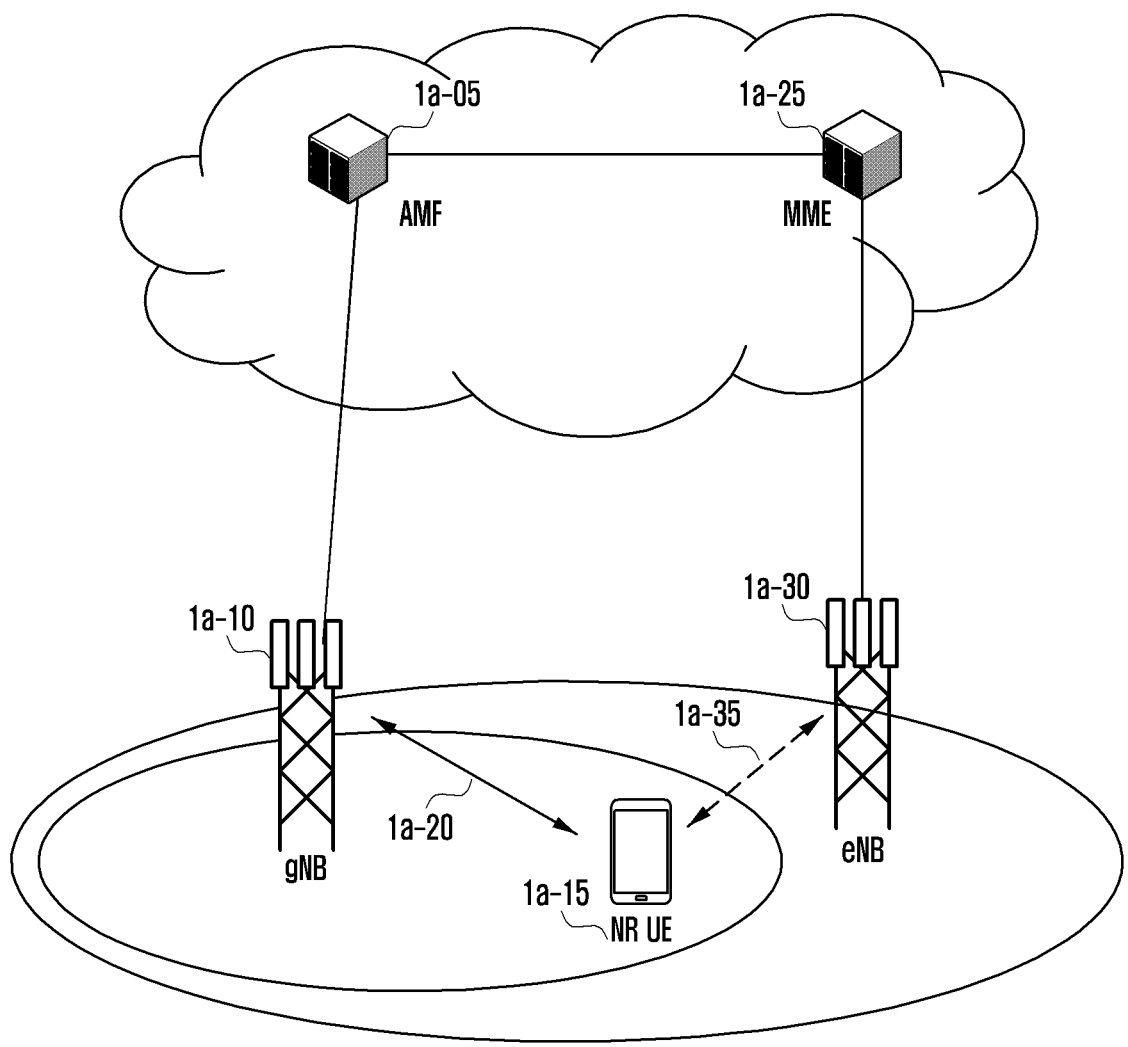
FIG. 1 is a diagram illustrating a structure of a next generation mobile communication system according to an embodiment of the disclosure.

FIG. 1 is a diagram illustrating a structure of a next generation mobile communication system.

With reference to FIG. 1, as illustrated, a radio access network of a new radio (NR) includes a new radio node B (hereinafter, gNB) 1a-10 and a new radio core network (AMF) 1a-05. A new radio user terminal (hereinafter, NR UE or terminal) 1a-15 accesses an external network through the gNB 1a-10 and the AMF 1a-05.

In FIG. 1, the gNB corresponds to an evolved node B (eNB) of an existing LTE system. The gNB is connected to the NR UE through a radio channel and may provide a service superior to that of the existing node B (1a-20). In the new radio, because all user traffic is serviced through a shared channel, a device for collecting and scheduling state information such as a buffer state, an available transmission power state, and a channel state of UEs is required, and the gNB 1a-10 is responsible for this. One gNB generally controls multiple cells. In order to implement ultra-high speed data transmission compared to existing LTE, the gNB may have the existing maximum bandwidth or more, and beamforming technology may be additionally grafted by using orthogonal frequency division multiplexing (hereinafter, referred to as OFDM) as radio access technology. Further, an adaptive modulation & coding (hereinafter, referred to as AMC) method that determines a modulation scheme and a channel coding rate according to a channel state of the UE is applied. The AMF 1a-05 performs functions such as mobility support, bearer configuration, and QoS configuration. The AMF is a device in charge of various control functions as well as a mobility management function for the UE and is connected to a plurality of base stations. Further, the new radio may be interworked with the existing LTE system, and the AMF is connected to an MME 1a-25 through a network interface. The MME is connected to an eNB 1a-30, which is the existing base station. A UE supporting LTE-NR dual connectivity may transmit and receive data while maintaining connection to not only the gNB but also the eNB (1a-35).

Figure 2:
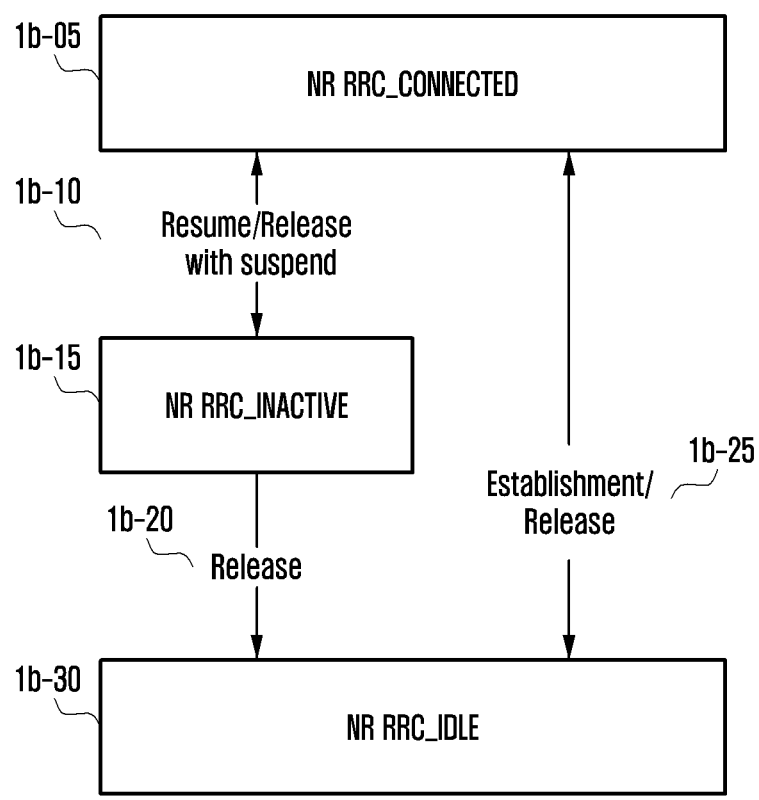
FIG. 2 is a block diagram illustrating a radio access state transition in a next generation mobile communication system according to an embodiment of the disclosure.

FIG. 2 is a block diagram illustrating a radio access state transition in a new radio.

The new radio has three radio access states (RRC states). The connected mode (RRC_CONNECTED) 1b-05 is a radio access state in which the UE may transmit and receive data. A standby mode (RRC_IDLE) 1b-30 is a radio access state in which the UE monitors whether paging is transmitted to itself. The two modes are radio access states applied to the existing LTE system, and the detailed technology is the same as that of the existing LTE system. In the new radio, an inactive (RRC_INACTIVE) radio connection state (1b-15) has been newly defined. In the radio access state, a UE context is maintained in the base station and the UE, and RAN-based paging is supported. Characteristics of the new radio access state are listed below.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

The new INACTIVE radio access state may be changed to a connected mode or a standby mode using a specific procedure. According to a resume process, the INACTIVE mode is converted to the connected mode, and the connected mode is converted to the INACTIVE mode using a release procedure including suspend configuration information (1b-10). The above procedure transmits and receives one or more RRC messages between the UE and the base station, and is composed of one or more steps. Further, an INAC- TIVE mode may be switched to a standby mode through a release procedure after resume (1b-20). Switching between a connected mode and a standby mode follows the existing LTE technology. For example, the mode is switched through an establishment or release procedure (1b-25).

Figure 3:
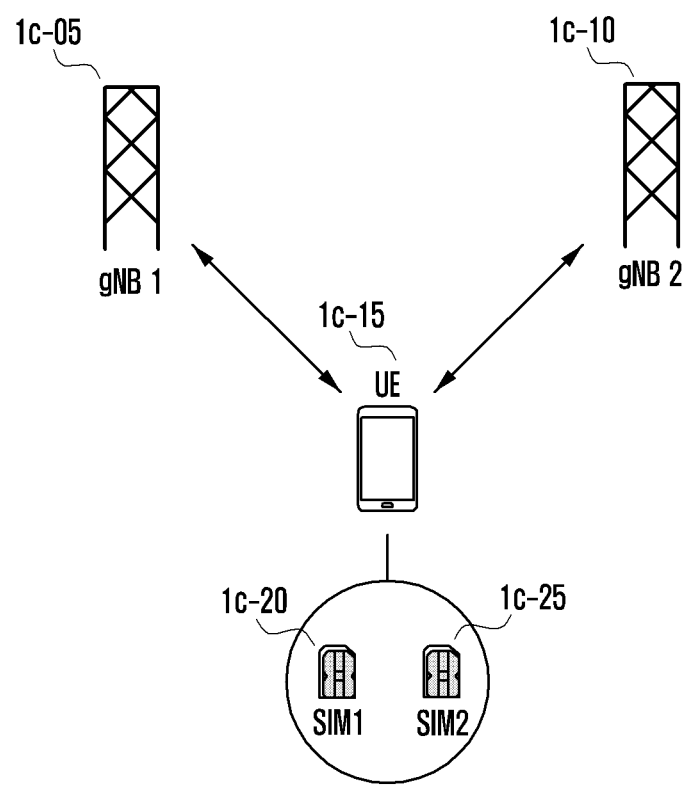
FIG. 3 is a diagram illustrating a terminal supporting a plurality of subscriber identity modules (SIMs) according to an embodiment of the disclosure.

FIG. 3 is a diagram illustrating a UE supporting a plurality of subscriber identity modules (SIMs) according to an embodiment of the disclosure.

A SIM is a device in which information of a mobile communication subscriber is stored, and the UE registers and accesses a network provided by a service provider subscribed by the subscriber using the information stored in the device. A multi-SIM UE 1c-15 according to an embodiment of the disclosure is a UE supporting two or more SIMs 1c-20 and 1c-25. The multi-SIM UE may operate in a first mode (hereinafter, dual SIM dual standby (DSDS) mode) or a second mode (hereinafter, dual SIM dual active (DSDA) mode). The DSDS mode and DSDA mode may be defined as follows.

DSDS: both SIMs can be used for idle-mode network connection, but when a radio connection (1c-05) is active the second connection (1c-10) is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained DSDA: both SIMs can be used in both idle and connected modes. Each SIM has a dedicated transceiver, meaning that there are no interdependencies on idle or connected mode operation at the modem level The disclosure proposes methods capable of smoothly performing a standby mode operation in another network in consideration of the multi-SIM UE supporting the first mode. The standby mode operation means paging monitoring and reception, system information reception, public warning system (PWS) information reception, and tracking area update (TAU).

Figure 4:
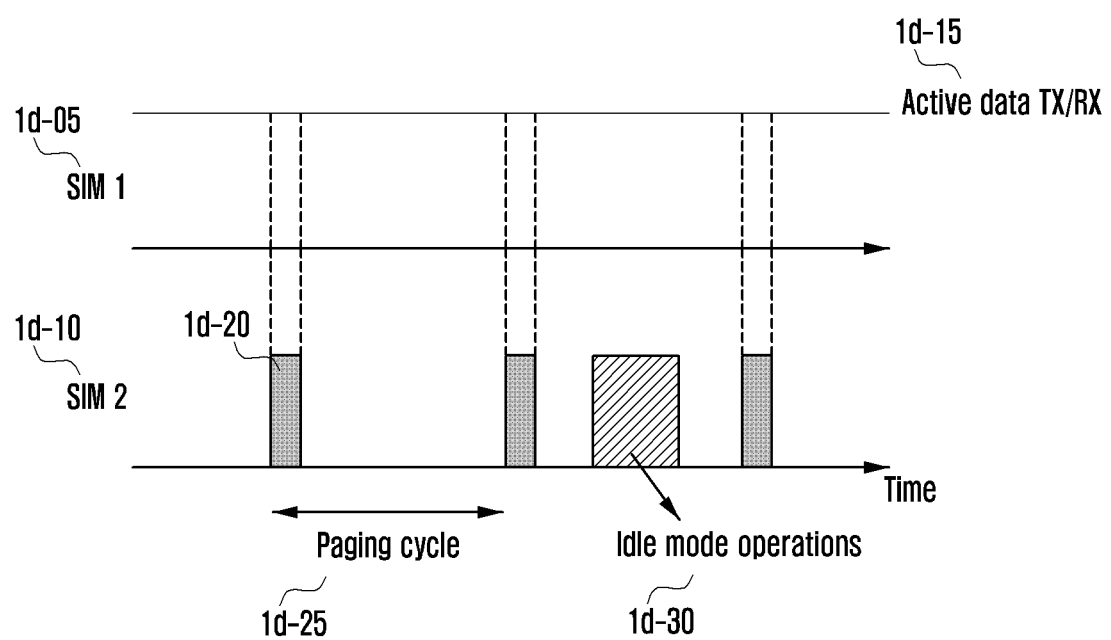
FIG. 4 is a diagram illustrating a collision occurring when a terminal supporting a plurality of SIMs transmits and receives data to and from a first network corresponding to a first SIM in a connected mode, and receives paging from a second network corresponding to a second SIM according to an embodiment of the disclosure.

FIG. 4 is a diagram illustrating a collision occurring when a UE supporting a plurality of SIMs transmits and receives data to and from a first network corresponding to a first SIM in a connected mode, and receives paging from a second network corresponding to a second SIM according to an embodiment of the disclosure.

If a multi-SIM UE supporting a first mode transmits and receives data to and from a first network 1d-05 corresponding to a first SIM in a connected mode (1d-15), there may be difficulties in monitoring paging transmitted from the second network 1d-10 corresponding to the second SIM (1d-25) or in performing other standby mode operations (1d-30). If the UE has one receiver and receives downlink data from the first network, the UE cannot receive paging, system information, and PWS information transmitted from the second network. TAU is a process of re-registering a paging area periodically or when the UE reselects a cell having a different tracking area (TA), and requires a connection with the network. In this case, the UE needs a transmission and reception process with the network. Therefore, the UE cannot perform a TAU operation according to whether other networks are transmitted and received.

The disclosure proposes a method of temporarily stopping or periodically stopping data transmission and reception with a network in a connected mode so that a multi-SIM UE can smoothly perform a standby mode operation with another network.

Figure 5:
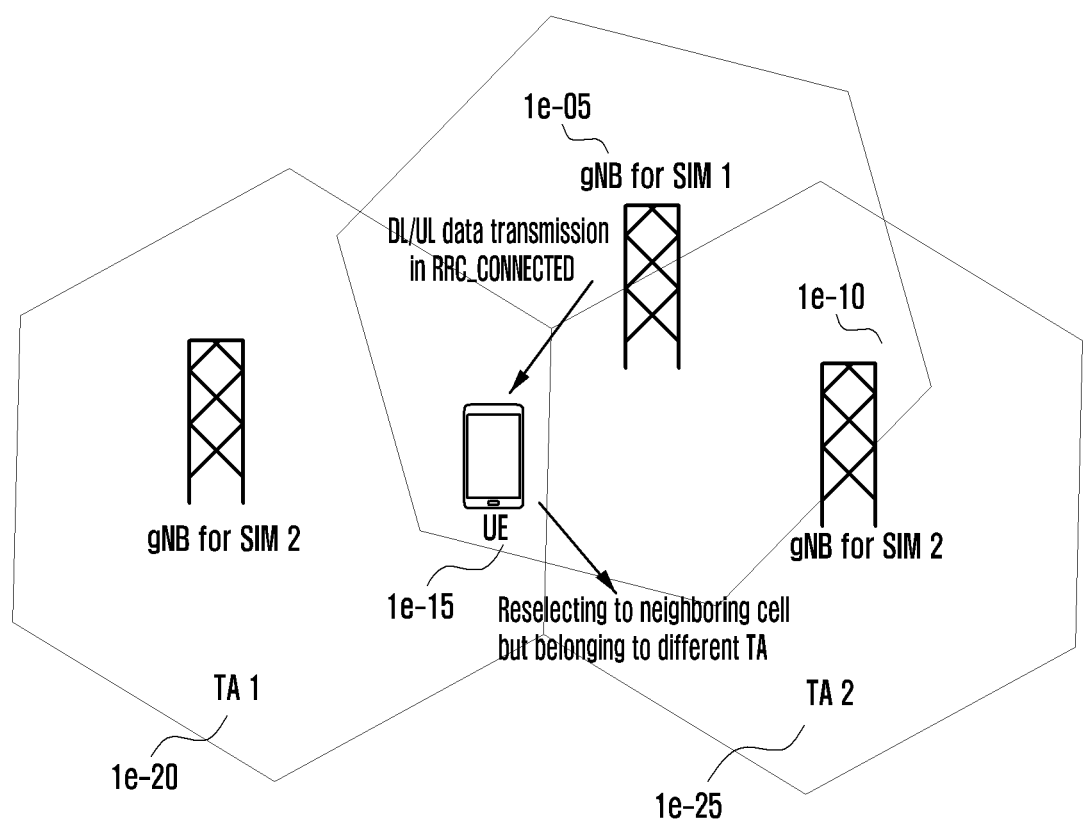
FIG. 5 is a diagram illustrating a scenario in which a terminal supporting a plurality of SIMs transmit and receive data to and from a first network corresponding to a first SIM in a connection mode, and perform a standby mode operation in a second network corresponding to a second SIM according to an embodiment of the disclosure.

FIG. 5 is a diagram illustrating a scenario in which a UE supporting a plurality of SIMs transmit and receive data to and from a first network corresponding to a first SIM in a connection mode, and performs a standby mode operation in a second network corresponding to a second SIM according to an embodiment of the disclosure.

A UE 1e-15 supporting a multi-SIM transmits and receives data to and from a first network 1e-05 corresponding to the SIM in a connected mode. In this case, the UE reselects a new cell in a second network 1e-10 corresponding to the second SIM. The UE should receive system information broadcast from the new cell. Alternatively, when a TA 1e-25 to which the cell belongs is different from a TA 1e-20 previously stored by the UE, a TAU operation should be performed.

Because standby mode operations such as system information reception and TAU are performed as a one-time operation, it is preferable to temporarily stop data transmission and reception rather than release of the connection mode with the first network in a pre-connected mode state. When the pre-connected mode is released so as to perform the standby mode operation, after performing the standby mode operation in the second network, when reconnection to the first network is required, an establishment or resume operation should be performed again. This causes a delay phenomenon and additional signaling in data transmission and reception.

In this embodiment, the UE may request a pause of data transmission and reception (scheduling operation) to a connecting network. Further, the paused data transmission and reception may be restarted based on a timer or by a UE request.

Figure 6:
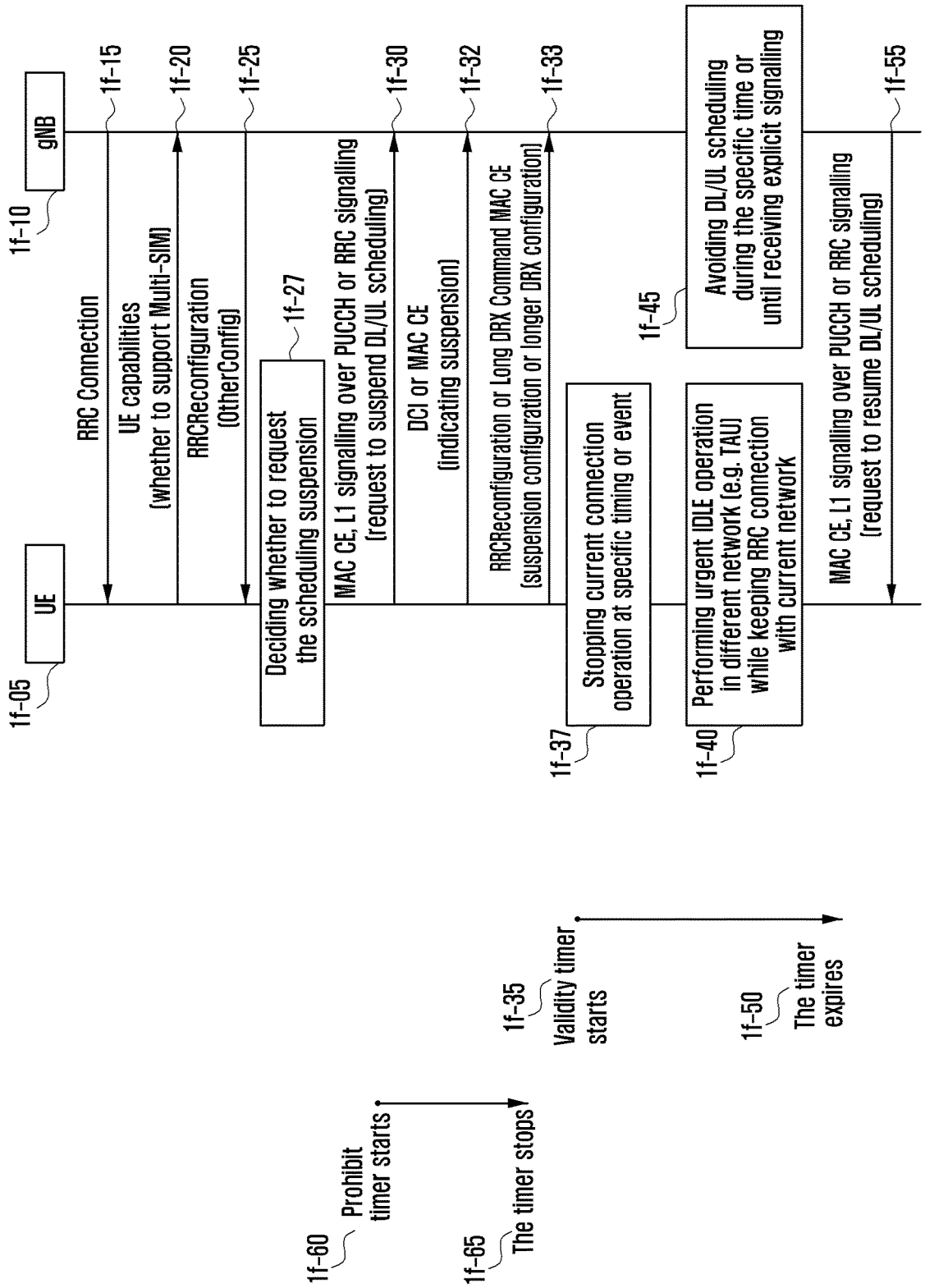
FIG. 6 is a message flow diagram illustrating a process of performing a scheduling pause operation according to an embodiment of the disclosure.

FIG. 6 is a message flow diagram illustrating a process of performing a scheduling pause operation according to an embodiment of the disclosure.

A base station 1f-10 may transmit capability information indicating that it supports the multi-SIM UE to the UE through broadcasting system information. The capability information implies that the scheduling pause operation is supported in this embodiment.

A UE 1f-05 is connected to the base station to receive a service (1f-15). In the case that the base station cannot obtain capability information of the UE through the AMF, the base station may receive the capability information of the UE directly from the UE (1f-20). The capability information of the UE includes information indicating that a multi-SIM is supported. Further, the capability information of the UE may include information indicating whether dual RX and dual TX may be supported. When there is no information on dual RX or dual TX support, it is regarded that the UE supports single RX or single TX. Further, information indicating whether to support a scheduling pause operation proposed in this embodiment may be separately reported.

The base station provides configuration information necessary for the UE to request the scheduling pause operation using a predetermined IE (OtherConfig) of a predetermined RRC message (RRCReconfiguration) (1f-25). The configuration information may include the following information.

Prohibit timer: A timer for limiting frequent requests, and when the UE reports the request, the timer is driven. The UE cannot transmit again the request until the timer expires.

Value range for a scheduling pause time: For example, value range information such as 5 ms, 10 ms, 30 ms, and 60 ms may be provided. In the case that the UE requests a scheduling pause, a preferred stop time among the values may be reported together. The configuration information is not separately configured, selectable values may be predefined, and the UE may select one of the values upon request. Further, in the case that data transmission and reception is restarted by explicit signaling from the UE, the configuration information may not be required.

Trigger condition for requesting scheduling pause: Condition(s) for requesting the scheduling pause operation may be provided. Alternatively, priority information regarding which operation should be prioritized more among an operation in a connection mode with a first network corresponding to a current first SIM and a standby operation in a second network corresponding to a second SIM may be provided. For example, in the case that a specific standby mode operation (at least one or all of TAU, system information reception, or PWS reception operation) is required in the second network, it may be configured that the UE may transmit the request to the first network. Further, it may be not preferable to unconditionally stop data transmission and reception that is being performed just because a standby mode operation is required in the second network. An important connected mode operation may be in progress in the first network. For example, in order to match uplink synchronization, a random access operation may be in progress or a beam failure recovery operation may be in progress. In the case that the above operation is being performed, it may be more desirable to temporarily suspend a standby mode operation in the second network. Accordingly, a condition for making the request may be configured by providing priority information of an operation to be performed between networks corresponding to the first SIM and the second SIM.

In order to perform a predetermined standby mode operation in the second network corresponding to the second SIM in the standby mode (or inactive mode), the UE determines whether data transmission and reception needs to be temporarily stopped in the first network corresponding to the first SIM in the connected mode (1*f*-25). In this case, the configured request trigger condition may be considered. Alternatively, it may be determined whether the request is made by the UE implementation without the base station configuration.

The UE that has determined to request a scheduling pause to the first network transmits predetermined signaling to the base station corresponding to the first network (1*f*-30). The signaling may include information on a pause time preferred by the UE. The predetermined signaling may be L1 signaling or a radio resource control (RRC) message transmitted to a medium access control control element (MAC CE) or a physical uplink control channel (PUCCH).

If the predetermined signaling is a MAC CE, a separate LCID indicating the MAC CE is allocated, and the predetermined signaling is a MAC CE having only a MAC subheader or a MAC CE composed of a MAC sub-PDU including a MAC subheader and the stop time. The stop time is an index value indicating one of the configured value ranges or one of the predefined value ranges.

If the predetermined signaling is L1 signaling, the information is composed of predetermined bits and is stored in the PUCCH. Some of the predetermined bits may be used for indicating a scheduling pause request or scheduling restart, and some thereof may be used for indicating the pause time. The stop time is an index value indicating one of the configured value ranges or one of the predefined value ranges.

If the predetermined signaling is an RRC message, the request information may be included in UEAssistanceInformation mainly used for reporting preference information of the UE or may be included in a newly defined RRC message. A new IE is defined to receive the request information, and the stop time information may be included in the IE. If no field is included in the IE, it means that the UE preference for the previous request is no longer existed. For example, it means scheduling restart. The UE may request a longer DRX cycle rather than a scheduling pause operation using UEAssistanceInformation.

In consideration of preferred stop time information reported by the UE, the base station will pause DL/UL scheduling or reconfigure or trigger a long DRX cycle.

In the case that data transmission and reception is restarted by explicit signaling from the UE, the time information may not be required. A MAC CE or L1 signaling is advantageous for transmitting information faster than a normal RRC message. The UE that has transmitted the signaling drives one prohibit timer (1*f*-60). The request cannot be retransmitted while the timer is driving. In the case that a predetermined condition is satisfied, the UE may stop the timer. For example, in the case that the UE receives signaling for configuring a scheduling pause operation from the base station for the request, the UE may stop the timer (1*f*-65).

The base station that has received the request information transmitted by the UE may transmit whether the request is approved and configuration information on the scheduling pause operation to the UE through predetermined signaling. For this, a new MAC CE, DCI (L1 signaling), or RRC message (RRCReconfiguration) is used (1*f*-32, 1*f*-33). When the new MAC CE or DCI (L1 signaling) is used, the scheduling pause operation may be driven more quickly. The signaling may include a timer value indicating a time for maintaining the scheduling stop operation. During the timer value, the base station will pause DL/UL scheduling. The reason for providing the timer value to the UE is to notify the UE of an expected scheduling restart time point. The timer value may be determined by the base station in consideration of the preference value requested by the UE. When the UE successfully receives the signaling, the UE drives the configured timer (1*f*-35).

The base station may reconfigure DRX configuration information in addition to the scheduling stop operation. The base station grants a longer DRX cycle so that the UE may perform a predetermined standby mode operation in another network during a time period other than an active time. When a long DRX cycle in the preconfigured DRX configuration information is long enough to perform a standby mode operation in another network, the long DRX command MAC CE is transmitted to the UE to apply the long DRX cycle. Otherwise, if a longer new DRX cycle is required, DRX is reconfigured using RRCReconfiguration.

After the signaling (1*f*-32, 1*f*-33) is received, it is regarded that there is no new scheduling from the base station. However, data transmission triggered before the signaling is transmitted may not be successfully completed even after the signaling is transmitted. For example, a retransmission operation for previous data may be continued. Accordingly, the operation may be exceptionally continued, but the operation may cause a conflict with a standby mode operation in another network. In this case, which operation is to be prioritized may be determined according to the base station configuration, that the existing connection mode operation with the current network always has a priority, that the standby mode operation with another network always has a priority, or the UE implementation determination. However, the data retransmission operation may be allowed only for a predetermined time after receiving the signaling (1*f*-37). The predetermined time may be predefined or determined by the base station configuration. If the predetermined time is determined according to the base station configuration, the predetermined time is stored in the signaling.

In the case that a scheduling stop operation is urgently needed, it may be difficult to wait for the signaling from the base station. Accordingly, after the request for the operation (1*f*-30), the UE may stop data transmission and reception with the network in the connected mode and perform an urgent standby mode operation in another network.

The UE performs a standby mode operation in the second network corresponding to the second SIM (1*f*-40). In this case, the first network corresponding to the first SIM also stops scheduling for the UE, but maintains the RRC connection state with the UE as it is (1*f*-45). When the driving scheduling stop time expires (1*f*-50), the base station of the first network may restart scheduling to the UE. Alternatively, the UE may request the base station to restart scheduling using explicit signaling (1*f*-55).

For the explicit signaling, a MAC CE, L1 signaling, or RRC message may be used.

As already mentioned above, the RRC message for the restart may be stored in UEAssistanceInformation mainly used for reporting preference information of the UE or may be stored in a newly defined RRC message. A new IE is defined to store the request information, and when no field is included in the IE, it means that the UE preference for the previous request is no longer existed. For example, it means scheduling restart.

Figure 7:
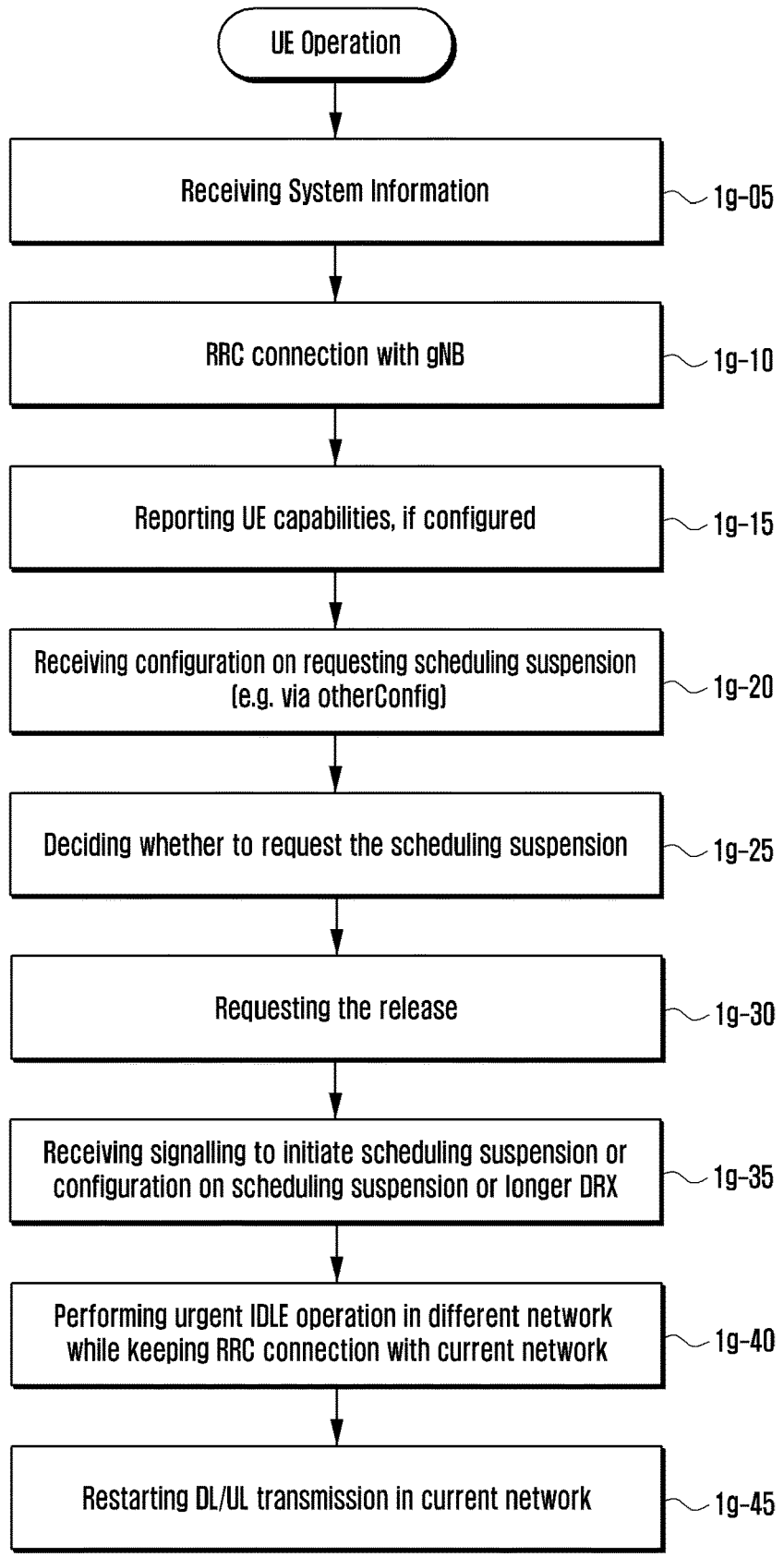
FIG. 7 is a flowchart illustrating an operation of a terminal performing a scheduling pause operation according to an embodiment of the disclosure.

FIG. 7 is a flowchart illustrating an operation of a UE performing a scheduling pause operation according to an embodiment of the disclosure.

In step 1*g*-05, the UE receives system information from the base station. The system information may include capability information indicating that the base station supports a multi-SIM UE.

In step 1*g*-10, the UE is connected to the base station through an establishment operation or a resume operation.

In step 1*g*-15, the UE reports capability information thereof to the base station according to a base station configuration. The capability information of the UE includes information indicating that a multi-SIM is supported.

In step 1*g*-20, the UE receives configuration information necessary for requesting the scheduling pause operation through a predetermined IE (OtherConfig) of a predetermined RRC message (RRCReconfiguration).

In step 1*g*-25, in order to perform a predetermined standby mode operation in the second network corresponding to the second SIM in a standby mode (or inactive mode), the UE determines whether data transmission and reception needs to be stopped for a while in the first network corresponding to the first SIM in a connected mode.

In step 1*g*-30, the UE requests a scheduling pause to the base station through L1 signaling or RRC message transmitted to a predetermined MAC CE or PUCCH.

In step 1*g*-35, the UE receives whether the request is approved and configuration information on the scheduling pause operation from the base station through L1 signaling or RRC message transmitted to a predetermined MAC CE or PUCCH.

In step 1*g*-40, the UE performs a standby mode operation in the second network corresponding to the second SIM.

In step 1*g*-45, the UE restarts scheduling by a request through explicit signaling or based on a timer.

Figure 8:
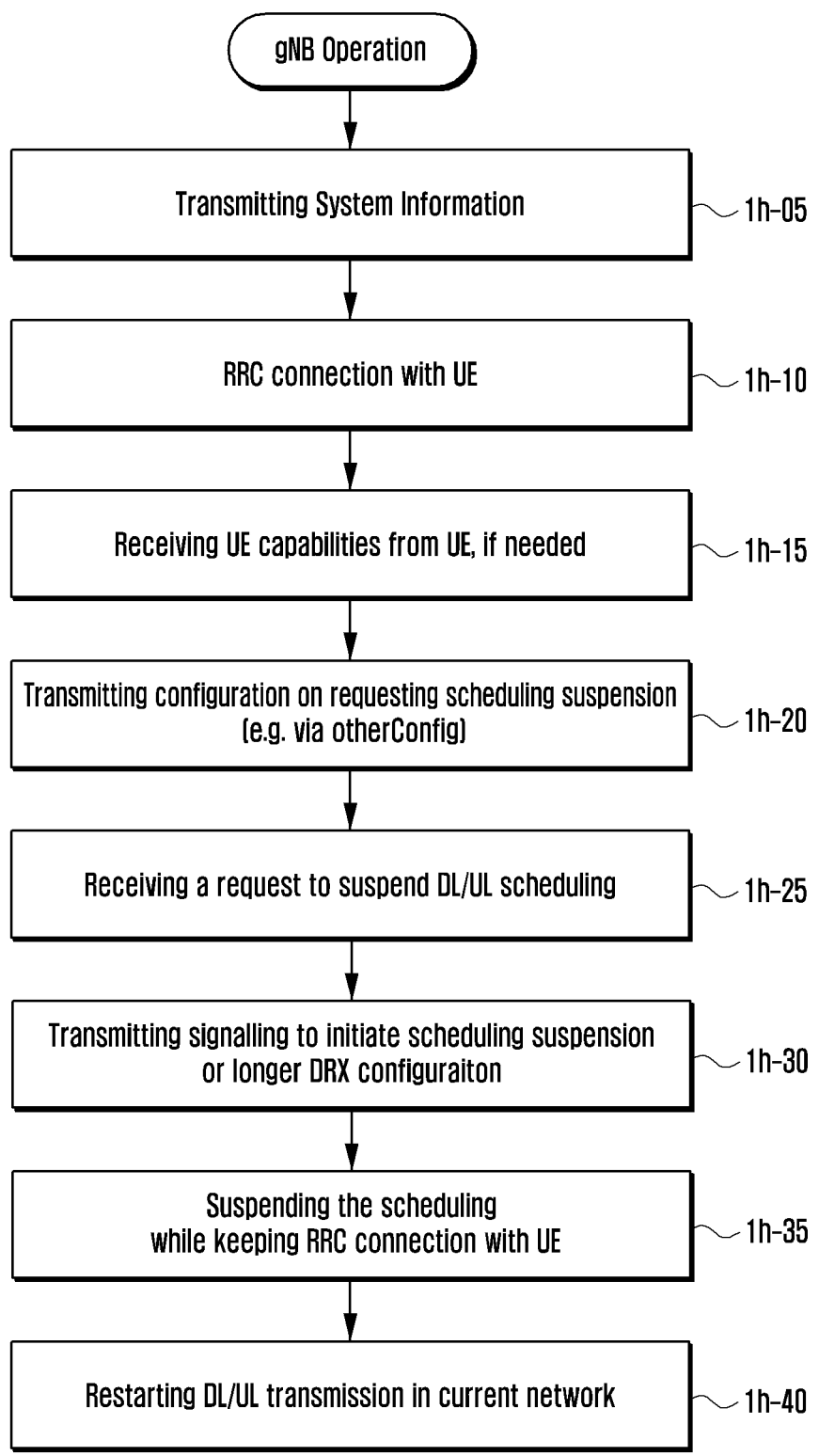
FIG. 8 is a flowchart illustrating an operation of a base station performing a scheduling pause operation according to an embodiment of the disclosure.

FIG. 8 is a flowchart illustrating an operation of a base station performing a scheduling pause operation according to an embodiment of the disclosure.

In step 1*h*-05, the base station broadcasts system information including capability information indicating that it supports a multi-SIM UE.

In step 1*h*-10, the base station is connected to a specific UE through an establishment operation or a resume operation.

In step 1*h*-15, in the case that the base station cannot obtain capability information on the UE from the AMF, the base station may request the UE to directly receive the capability information of the UE.

In step 1*h*-20, the base station transmits configuration information necessary for requesting the scheduling pause operation to the UE through a predetermined IE (OtherConfig) of a predetermined RRC message (RRCReconfiguration).

In step 1*h*-25, the base station receives a request for scheduling pause from the UE through L1 signaling or RRC message transmitted to a predetermined MAC CE or PUCCH.

In step 1*h*-30, the base station transmits to the UE whether the request is approved and configuration information on the scheduling pause operation through L1 signaling or RRC message transmitted to a predetermined MAC CE or PUCCH.

In step 1*h*-35, the base station stops scheduling to the UE.

In step 1*h*-40, the base station restarts scheduling according to a request through explicit signaling or based on a timer.

Figure 9:
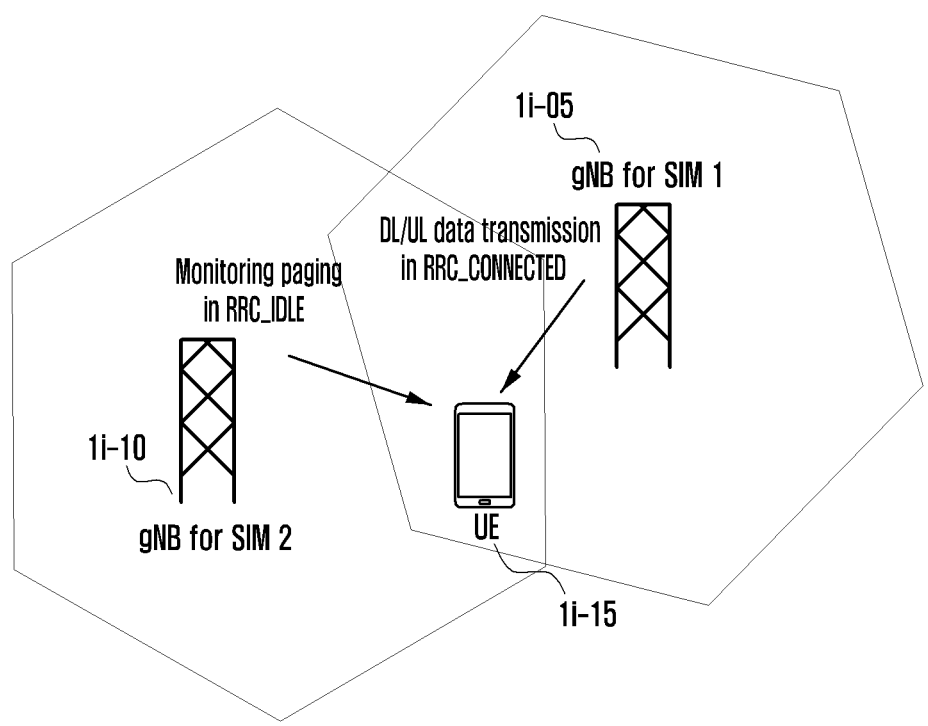
FIG. 9 is a diagram illustrating a scenario in which a terminal supporting a plurality of SIMs transmits and receives data to and from a first network corresponding to a first SIM in a connected mode and receives paging from a second network corresponding to a second SIM according to an embodiment of the disclosure.

FIG. 9 is a diagram illustrating a scenario in which a UE supporting a plurality of SIMs transmits and receives data to and from a first network corresponding to a first SIM in a connected mode and receives paging from a second network corresponding to a second SIM according to an embodiment of the disclosure.

A UE 1*i*-15 supporting the multi-SIM transmits and receives data to and from a first network 1*i*-05 corresponding to the SIM in a connected mode. In this case, the UE monitors paging from a second network 1*i*-10 corresponding to a second SIM.

Because standby mode operations such as paging monitoring are performed periodically, it is necessary to periodically stop data transmission and reception in the connected mode with the first network in a pre-connected mode. Because the standby mode operation is not a one-time operation, it is not preferable to release the pre-connected mode in order to perform the standby mode operation.

In this embodiment, the UE may request periodical stop of the data transmission and reception (scheduling operation) to the connecting network. The periodic data transmission and reception stop may be released based on a timer, according to a configuration, or by a UE request.

Figure 10:
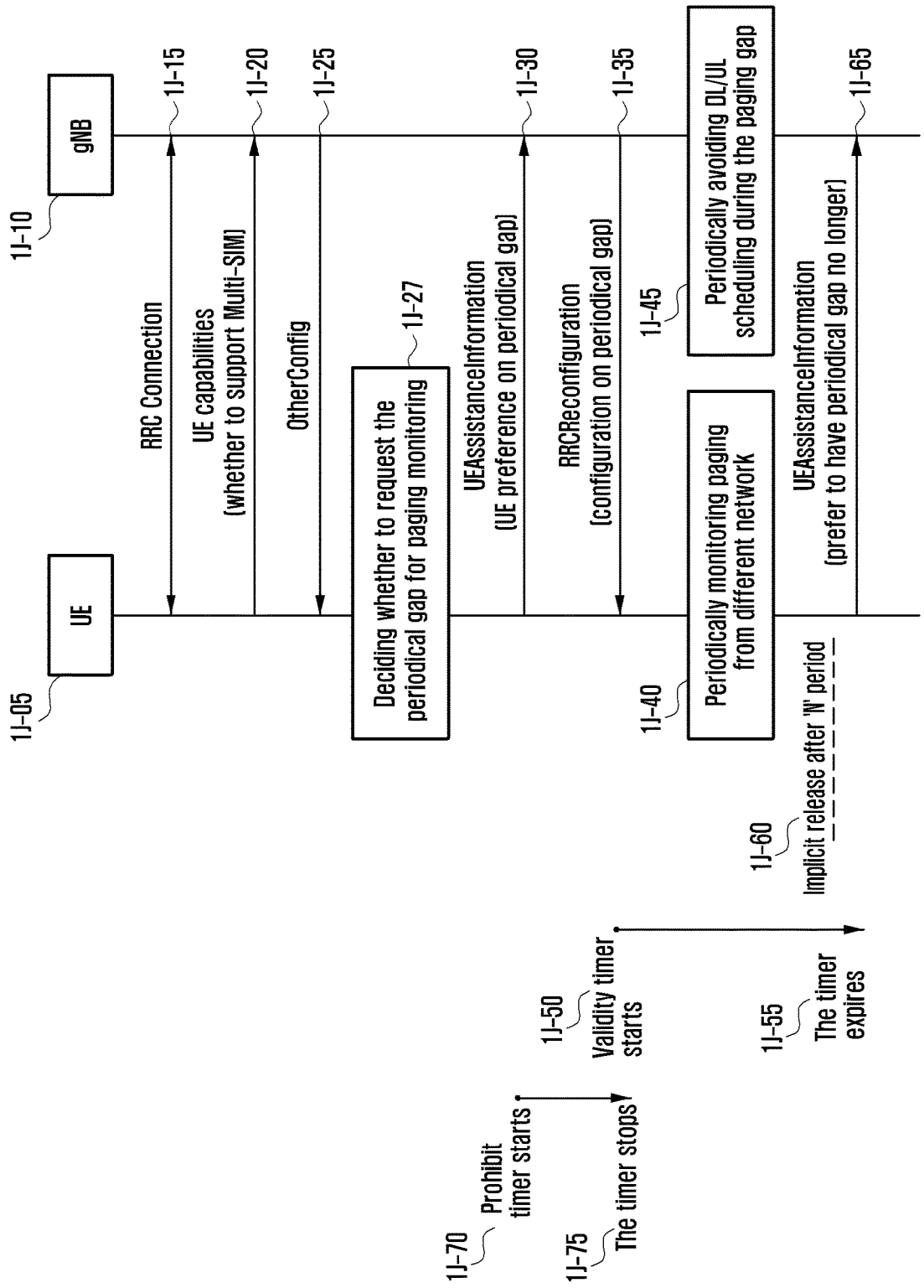
FIG. 10 is a message flow diagram illustrating a process of configuring a periodic paging monitoring time interval according to an embodiment of the disclosure.

FIG. 10 is a message flow diagram illustrating a process of configuring a periodic paging monitoring time interval according to an embodiment of the disclosure.

A base station 1*j*-10 may transmit capability information indicating that it supports a multi-SIM UE to the UE through broadcasting system information. The capability information implies that a periodic pause operation is supported in this embodiment.

A UE 1j-05 is connected to the base station to receive a service (1j-15). In the case that the base station cannot obtain capability information of the UE from an AMF, the base station may receive capability information of the UE directly from the UE (1j-20). The capability information of the UE includes information indicating that a multi-SIM is supported. Further, the capability information of the UE may include information indicating whether dual RX and dual TX may be supported. When there is no information on dual RX or dual TX support, it is regarded that the UE supports single RX or single TX. Further, information indicating whether to support a periodic pause operation proposed in this embodiment may be separately reported.

The base station provides configuration information necessary for the UE to request the periodic pause operation using a predetermined IE (OtherConfig) of a predetermined RRC message (RRCReconfiguration) (1j-25). The configuration information may include the following information.

Prohibit timer: A timer for limiting frequent requests, and when the UE reports the request, the timer is driven. The UE cannot transmit again the request until the timer expires.

In order to perform a paging monitoring operation in the second network corresponding to the second SIM in a standby mode (or inactive mode), the UE determines whether data transmission and reception needs to be stopped periodically in the first network corresponding to the first SIM in a connected mode (1j-27). The UE that has determined to request the first network to stop periodic scheduling transmits a predetermined RRC message to the base station corresponding to the first network (1j-30). For example, the predetermined RRC message is UEAssistanceInformation.

In the RRC message, a new IE is defined to receive the request information, and the received request information may include periodic gap information preferred by the UE. The preferred periodic gap information is determined in consideration of a paging monitoring period in the second network. Timing monitoring the paging refers to TS38.331 standard document. The preferred periodic gap information includes at least an offset value and a length value of the gap pattern. The offset value is used for deriving a time point at which the periodic gap pattern starts, and the network stops transmitting and receiving data during a length of the gap pattern. In this case, a system frame number (SFN) and subframe of a spCell (PCell or PSCell) in the first network are used as a reference for the offset. The UE calculates whether the current subframe or slot belongs to the gap by substituting the configured offset value and the current SFN and subframe values of the spCell into a predetermined equation. Another method is to store parameters used for deriving paging monitoring timing in the second network in the request information. The parameters are as follows.

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination

UE_ID: 5G-S-TMSI mod 1024

The UE that has transmitted the signaling drives one prohibit timer (1j-70). The request cannot be retransmitted again while the timer is driving. When a predetermined condition is satisfied, the UE may stop the timer. For example, when the UE receives signaling for configuring a periodic scheduling stop operation from the base station for the request, the UE may stop the timer (1j-75).

The base station that has received the request configures a periodic gap to the UE in consideration of the preference information using a predetermined RRC message (1j-35). The configured periodic gap information includes at least an offset value and a length value of the gap pattern. The message may include time interval information (validity timer) to which the UE applies the periodic gap or a valid 'N' period number value to which the gap is applied. For example, the predetermined RRC message is RRCReconfiguration. The UE providing the configuration information stops data transmission and reception in the network currently in a connection mode for each configured gap and monitors paging in other networks (1j-40).

When the configuration information includes a validity value indicating a time that maintains the scheduling stop operation, the base station will periodically pause DL/UL scheduling (1j-45) until the timer expires (1j-55). The reason for providing the timer value to the UE is to notify the UE of an expected normal scheduling start time. When the UE successfully receives the configuration information, the UE drives the configured timer (1j-50). When the valid 'N' period number value is provided, the UE regards that normal scheduling starts after the configured gap occurs N times. When the validity timer or the 'N' value is not provided, the base station pauses data transmission and reception at each periodic gap until there is a request from the UE. When it is no longer necessary for the second network to monitor paging, if a predetermined RRC message (UEAssistanceInformation) (1j-65) does not include any field in the new IE for comprising the request information, it means that the UE preference for the previous request is no longer existed. For example, it means to request normal scheduling restart.

Figure 11:
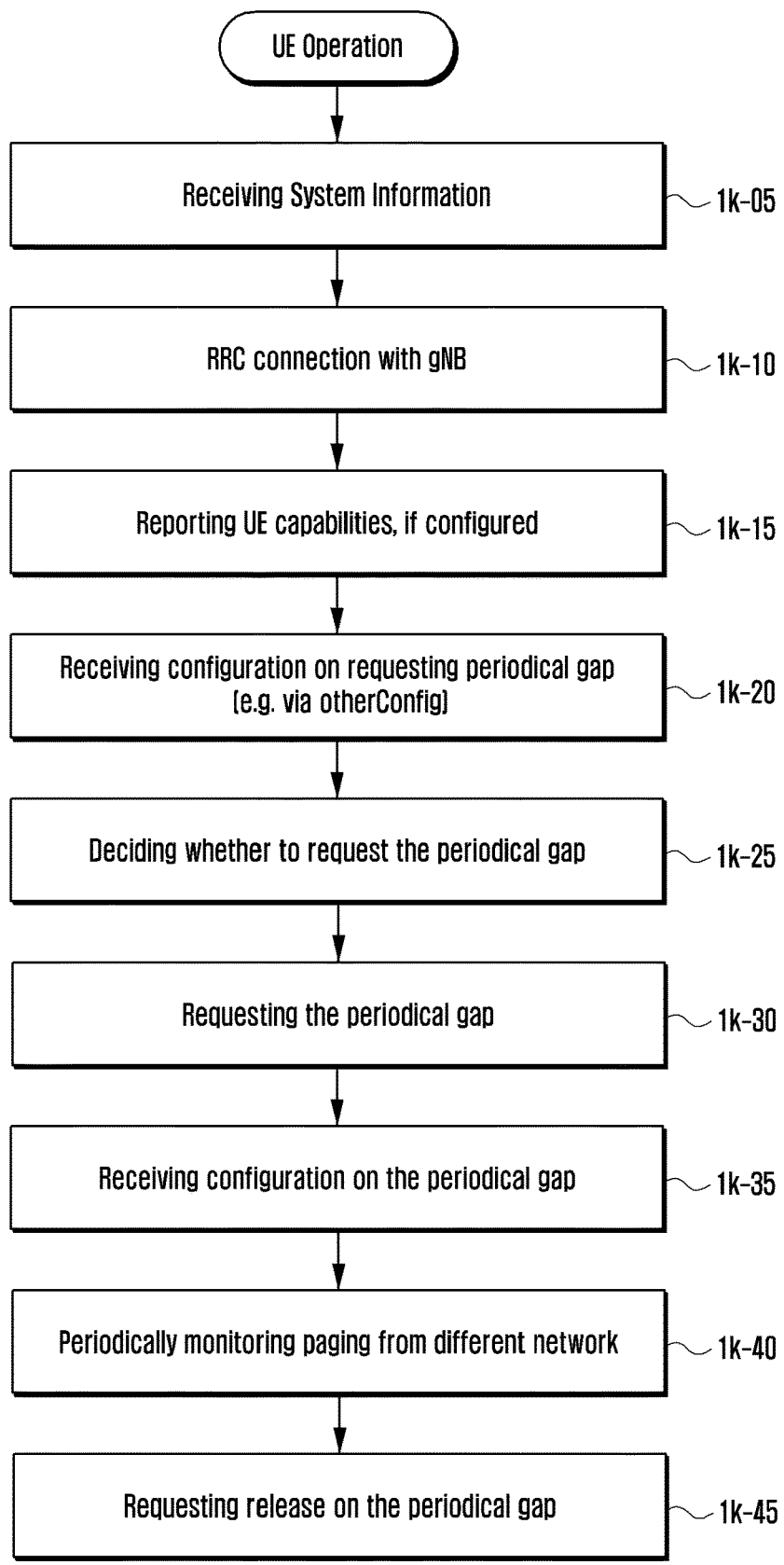
FIG. 11 is a flowchart illustrating a terminal operation for configuring a periodic paging monitoring time interval according to an embodiment of the disclosure.

FIG. 11 is a flowchart illustrating an operation of a UE for configuring a periodic paging monitoring time interval according to an embodiment of the disclosure.

In step 1k-05, the UE receives system information from the base station. The system information may include capability information indicating that the base station supports a multi-SIM UE.

In step 1k-10, the UE is connected to the base station through an establishment operation or a resume operation.

In step 1k-15, the UE reports capability information thereof to the base station according to the base station configuration. The capability information of the UE includes information indicating that a multi-SIM is supported.

In step 1k-20, the UE receives configuration information necessary for requesting the periodic gap for paging monitoring through a predetermined IE (OtherConfig) of a predetermined RRC message (RRCReconfiguration).

In step 1k-25, in order to perform a predetermined standby mode operation in the second network corresponding to the second SIM in a standby mode (or inactive mode), the UE determines whether data transmission and reception needs to be stopped periodically in the first network corresponding to the first SIM in a connected mode.

In step 1k-30, the UE requests the base station to stop periodic data transmission and reception through a predetermined RRC message.

In step 1k-35, the UE receives, from the base station, whether the request is approved and configuration information on the periodic data transmission and reception stop operation through a predetermined RRC message.

In step 1k-40, the UE periodically performs a paging monitoring operation in the second network corresponding to the second SIM.

In step 1k-45, the UE releases the periodic data transmission and reception stop operation by a request through explicit signaling or based on a timer.

Figure 12:
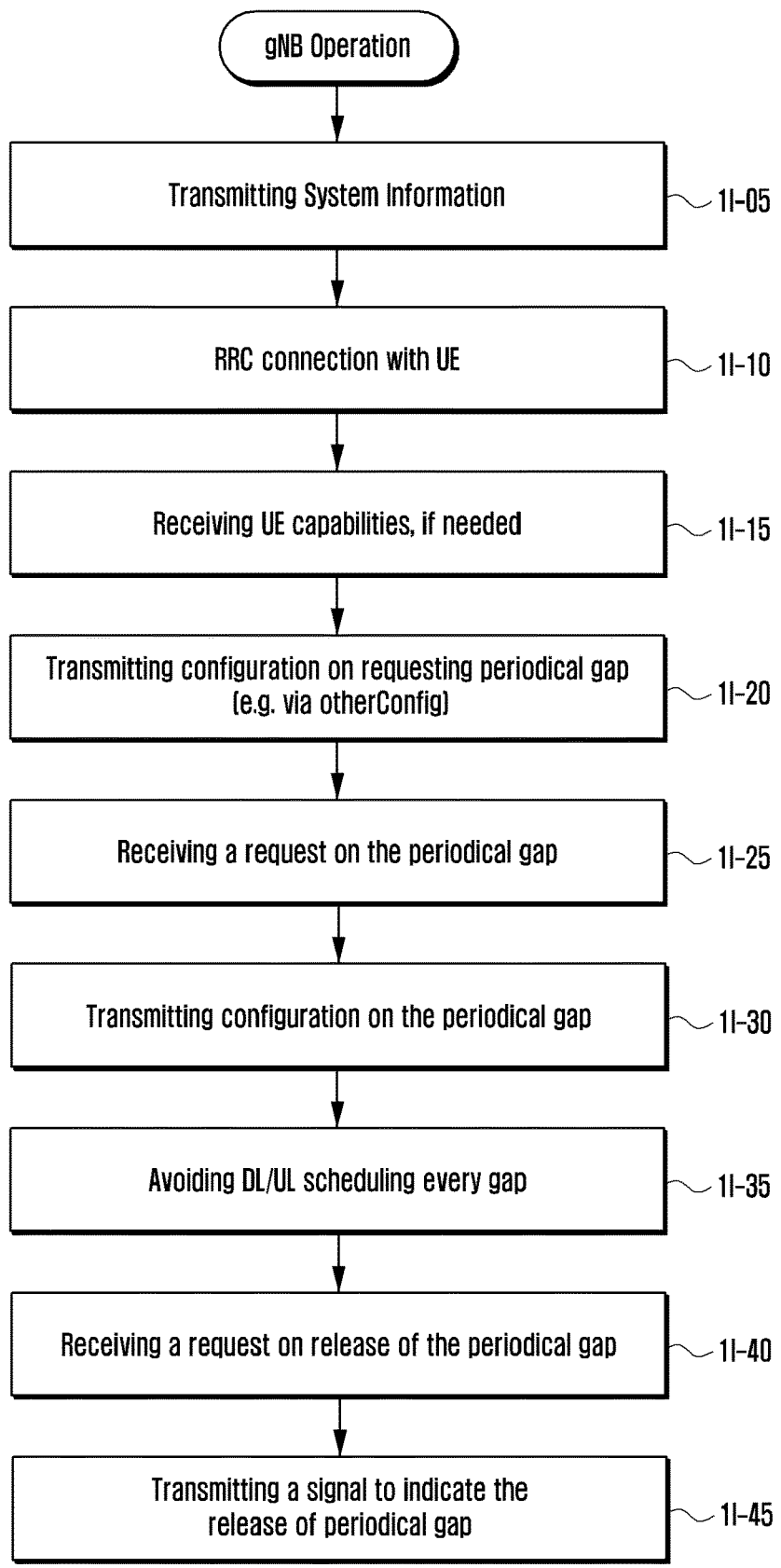
FIG. 12 is a flowchart illustrating an operation of a base station for configuring a periodic paging monitoring time interval according to an embodiment of the disclosure.

FIG. 12 is a flowchart illustrating an operation of a base station for configuring a periodic paging monitoring time interval according to an embodiment of the disclosure.

In step 1l-05, the base station broadcasts system information including capability information indicating that it supports a multi-SIM UE.

In step 1l-10, the base station is connected to a specific UE through an establishment operation or a resume operation.

In step 1l-15, in the case that the base station cannot obtain capability information from the UE through the AMF, the base station may request the UE to directly receive the capability information of the UE.

In step 1l-20, the base station transmits configuration information necessary for requesting the periodic data transmission and reception stop operation to the UE through a predetermined IE (OtherConfig) of a predetermined RRC message (RRCReconfiguration).

In step 1l-25, the base station receives a request to periodically stop transmitting and receiving data from the UE through a predetermined RRC message.

In step 1l-30, the base station transmits whether the request is approved, and configuration information on the periodic data transmission and reception stop operation to the UE through a predetermined RRC message.

In steps 1l-35, the base station pauses data transmission and reception to the UE at each periodic gap.

In step 1l-40, the base station receives a message requesting release of the periodic gap from the UE.

In steps 1l-45, the base station releases the periodic gap according to a request through explicit signaling or based on a timer.

Figure 13:
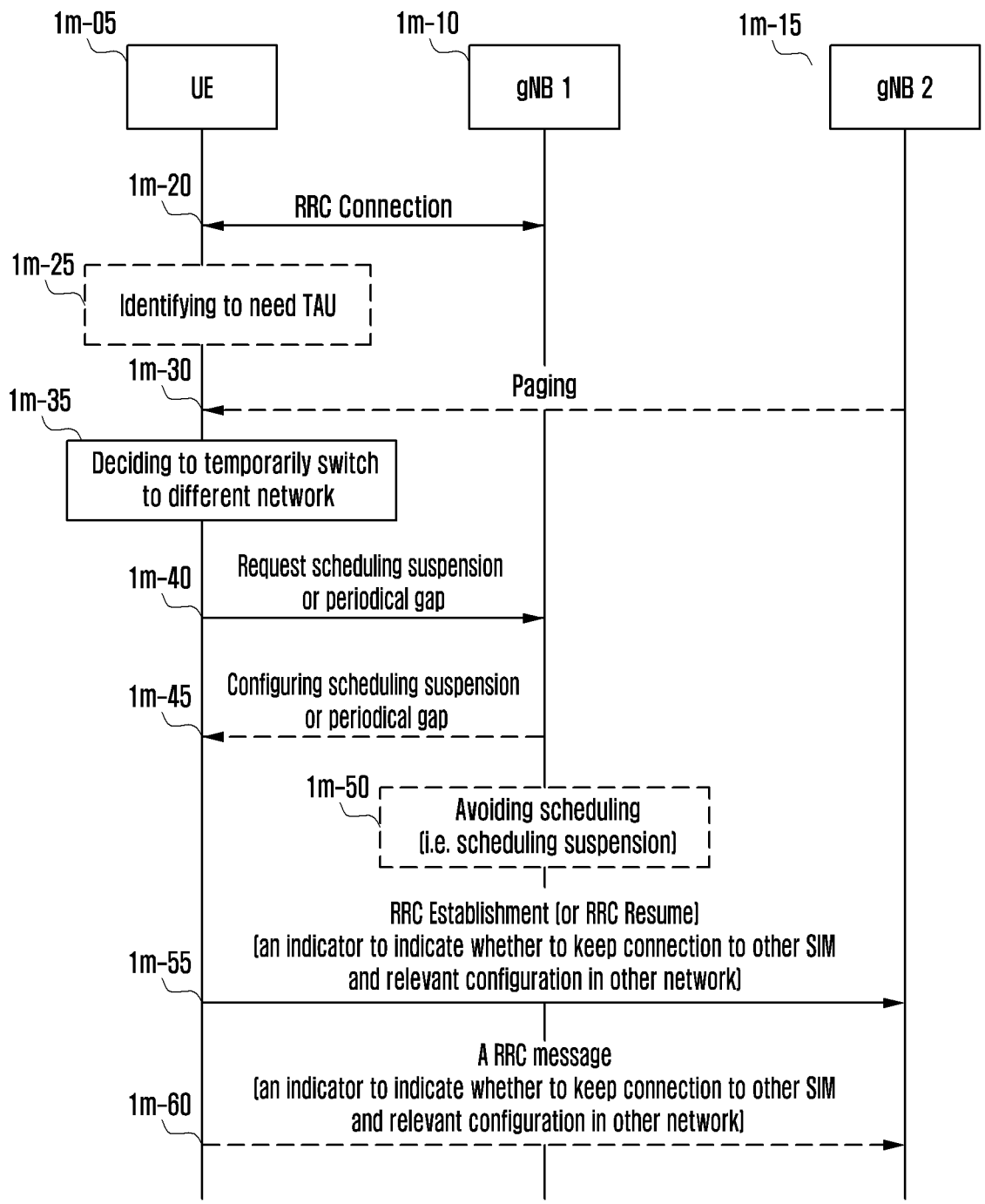
FIG. 13 is a message flow diagram illustrating a process of reporting configuration information in another network according to an embodiment of the disclosure.

FIG. 13 is a message flow diagram illustrating a process of reporting configuration information in another network according to an embodiment of the disclosure.

A UE 1m-05 is connected to a first base station 1m-10 corresponding to the first SIM to receive a service (1m-20). The UE triggers TAU in a second base station corresponding to the second SIM (1m-25) or receives paging from the second base station (1m-30). The UE determines to temporarily perform an RRC connection to the second base station while maintaining the RRC connection with the first base station (1m-35). The UE requests the proposed data transmission and reception pause or periodic pause to the first base station (1m-40). The first base station configures data transmission and reception pause or periodic pause to the UE according to the request (1m-45). The first base station performs the configured data transmission and reception pause or periodic pause (1m-50).

The UE switches to the connected mode to the second base station through an establishment or resume process (1m-55). In the above process, the UE stores information indicating that it is performing a data transmission and reception pause or periodic pause operation with the first base station in an RRCSetupComplete or RRCResumeComplete message while still in connected mode, and configuration information related to the operation to report to the second base station. The UE may report the information to the second base station through a predetermined RRC message (1m-60). The second base station that has received the information may determine a connection state of the UE with another base station, and will perform appropriate configuration and disconnection operations so that data may be transmitted and received again to the other base station at an appropriate time.

Figure 14:
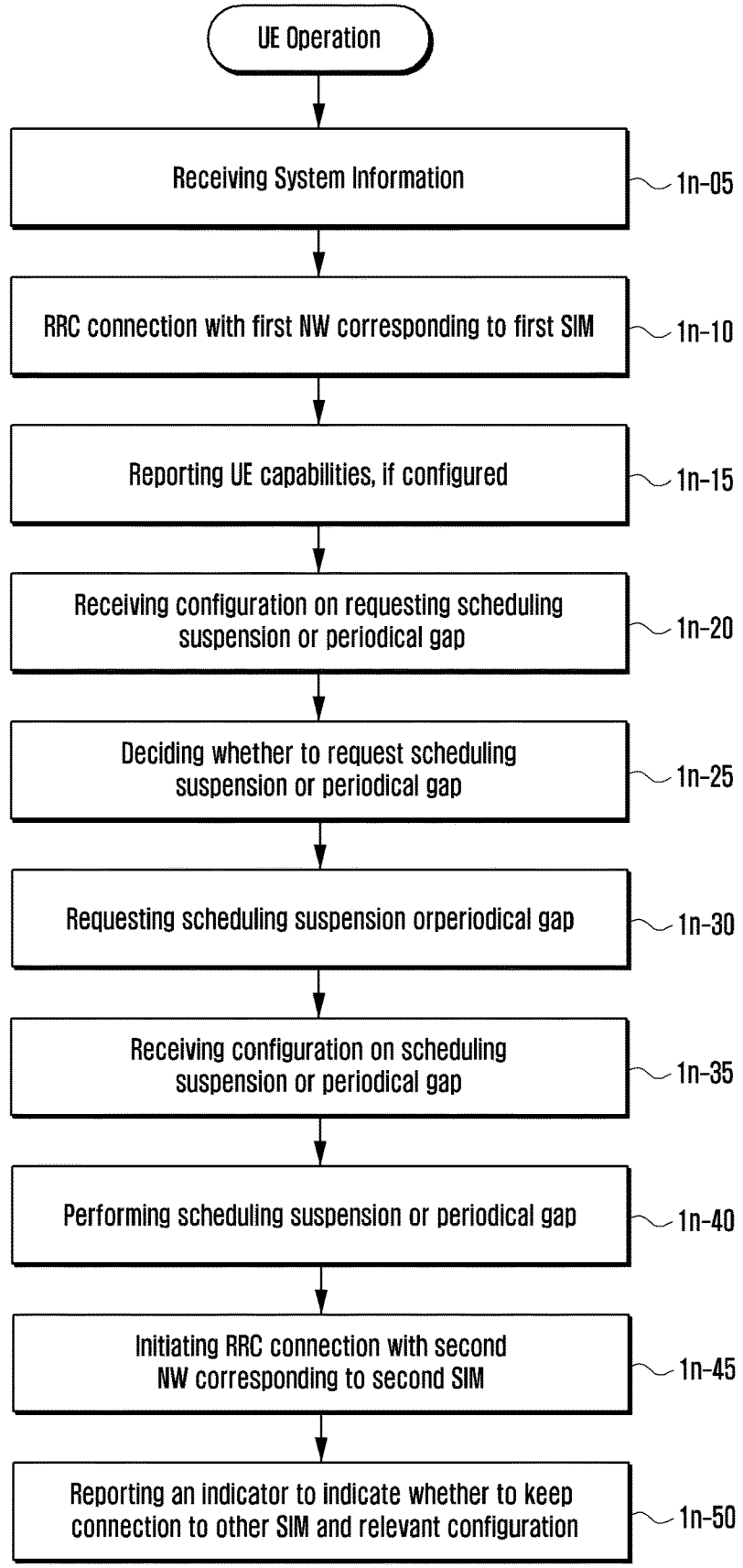
FIG. 14 is a flowchart illustrating an operation of a terminal reporting configuration information in another network according to an embodiment of the disclosure.

FIG. 14 is a flowchart illustrating an operation of a UE reporting configuration information in another network according to an embodiment of the disclosure.

In step 1n-05, the UE receives system information from the base station. The system information may include capability information indicating that the base station supports a multi-SIM UE.

In step 1n-10, the UE is connected to a first base station corresponding to the first SIM through an establishment operation or a resume operation.

In step 1n-15, the UE reports capability information thereof to the base station according to a base station configuration. The capability information of the UE includes information indicating that a multi-SIM is supported.

In step 1n-20, the UE receives configuration information necessary for requesting a data transmission and reception pause or a periodic pause operation from the first base station through a predetermined IE (OtherConfig) of a predetermined RRC message (RRCReconfiguration).

In step 1n-25, in order to perform a predetermined standby mode operation in the second network corresponding to the second SIM in a standby mode (or inactive mode), the UE determines whether data transmission and reception pause or a periodic pause operation is required in the first base station corresponding to the first SIM in a connected mode.

In step 1n-30, the UE requests a data transmission and reception pause or periodic pause operation to the first base station through predetermined signaling.

In step 1n-35, the UE receives whether the request is approved and configuration information on the data transmission and reception pause or periodic pause operation from the first base station through predetermined signaling.

In step 1n-40, the UE performs the data transmission and reception pause or periodic pause operation.

In step 1n-45, the UE connects an RRC to the second base station corresponding to the second SIM.

In step 1n-50, the UE reports, to the second base station, information indicating that it is performing a data transmission and reception pause or periodic pause operation while still in a connected mode with the first base station.

Figure 15:
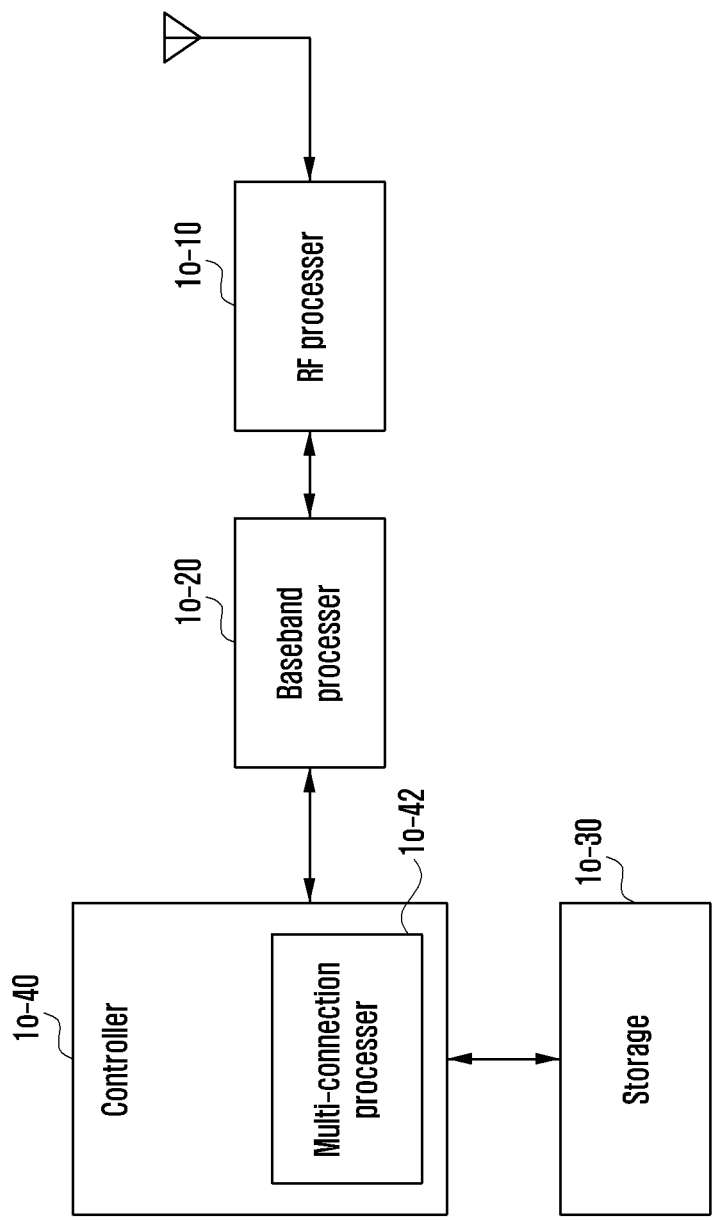
FIG. 15 is a block diagram illustrating an internal structure of a terminal according to an embodiment of the disclosure.

FIG. 15 is a block diagram illustrating an internal structure of a UE to which the disclosure is applied.

With reference to FIG. 15, the UE includes a radio frequency (RF) processor 1o-10, a baseband processor 1o-20, a storage 1o-30, and a controller 1o-40.

The RF processor 1o-10 performs a function for transmitting and receiving a signal through a wireless channel, such as band conversion and amplification of a signal. For example, the RF processor 1o-10 may up-convert a baseband signal provided from the baseband processor 1o-20 into an RF band signal, transmits the RF band signal through an antenna, and down-convert the RF band signal received through the antenna into a baseband signal. For example, the RF processor 1o-10 may include a transmission filter, a reception filter, an amplifier, a mixer, an oscillator, a digital to analog converter (DAC), an analog to digital converter (ADC), and the like. In FIG. 15, although only one antenna is illustrated, the UE may include a plurality of antennas. Further, the RF processor 1o-10 may include a plurality of RF chains. Furthermore, the RF processor 1o-10 may perform beamforming. For the beamforming, the RF processor 1o-10 may adjust a phase and magnitude of each of signals transmitted and received through a plurality of antennas or antenna elements. Further, the RF processor may perform MIMO, and receive multiple layers when performing a MIMO operation.

The baseband processor 1o-20 performs a function of converting a baseband signal and a bit stream according to a physical layer standard of a system. For example, when transmitting data, by encoding and modulating the transmitted bit stream, the baseband processor 1o-20 generates complex symbols. Further, when receiving data, by demodulating and decoding the baseband signal provided from the RF processer 1o-10, the baseband processor 1o-20 restores the received bit stream. For example, in the case of following orthogonal frequency division multiplexing (OFDM) scheme, when transmitting data, the baseband processer 1o-20 encodes and modulates a transmission bit stream to generate complex symbols, maps the complex symbols to subcarriers, and then form OFDM symbols through inverse fast Fourier transform (IFFT) operation and cyclic prefix (CP) insertion. Further, when receiving data, the baseband processer 1o-20 divides the baseband signal provided from the RF processer 1o-10 into units of an OFDM symbol, restores signals mapped to subcarriers through a fast Fourier transform (FFT) operation, and then restores the received bit stream through demodulation and decoding.

The baseband processer 1o-20 and the RF processer 1o-10 transmit and receive signals, as described above. Accordingly, the baseband processer 1o-20 and the RF processer 1o-10 may be referred to as a transmitter, a receiver, a transceiver, or a communication unit. Furthermore, at least one of the baseband processer 1o-20 or the RF processer 1o-10 may include a plurality of communication modules so as to support a plurality of different radio access technologies. Further, at least one of the baseband processer 1o-20 or the RF processer 1o-10 may include different communication modules so as to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band, and a millimeter wave (e.g., 60 GHz) band.

The storage 1o-30 stores data such as a basic program, an application program, and configuration information for an operation of the UE. In particular, the storage 1o-30 may store information related to a second access node that performs wireless communication using second radio access technology. The storage 1o-30 provides stored data according to a request of the controller 1o-40.

The controller 1o-40 controls overall operations of the UE. For example, the controller 1o-40 transmits and receives signals through the baseband processor 1o-20 and the RF processor 1o-10. Further, the controller 1o-40 writes and reads data in the storage 1o-30. To this end, the controller 1o-40 may include at least one processor. For example, the controller 1o-40 may include a communication processor (CP) that controls for communication and an application processor (AP) that controls an upper layer such as an application program.

Figure 16:
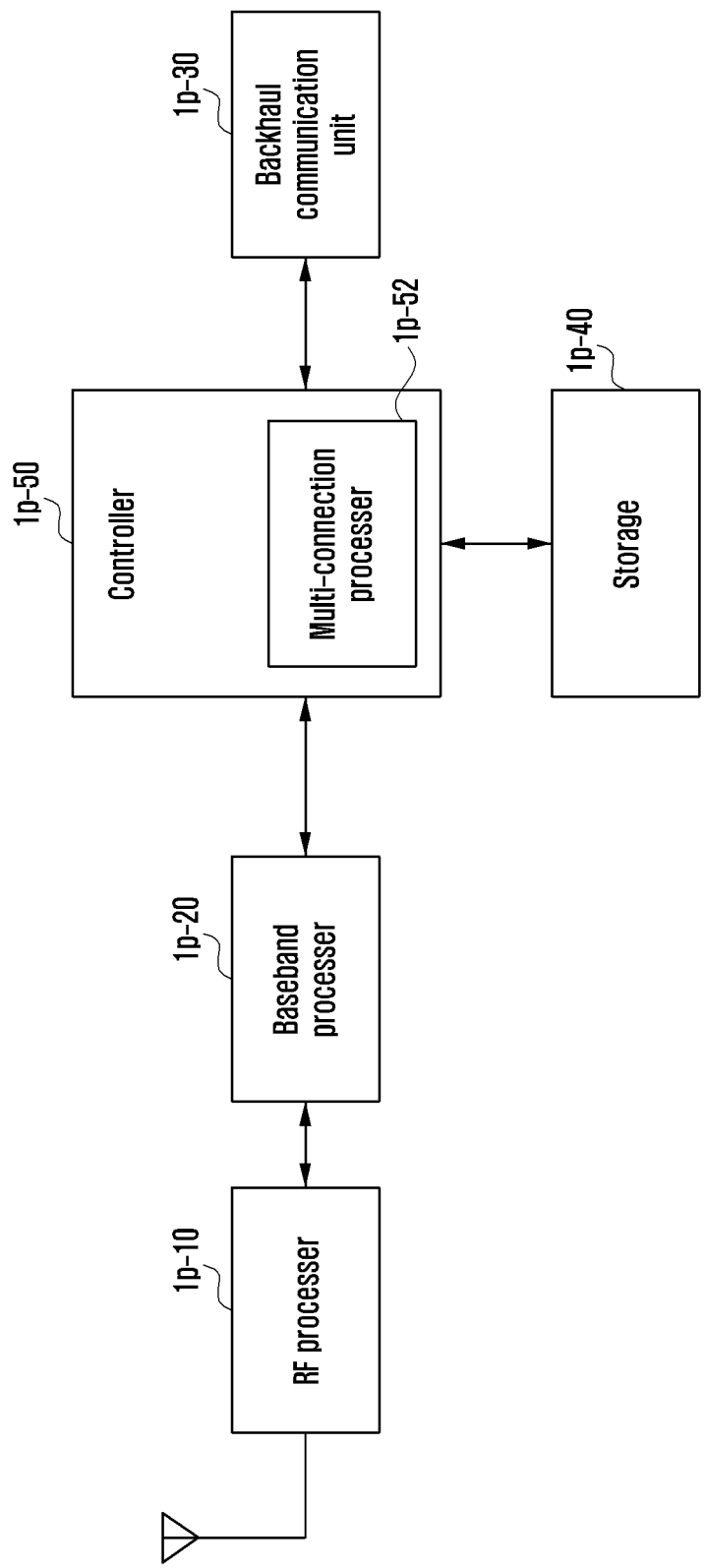
FIG. 16 is a block diagram illustrating a constitution of a base station according to an embodiment of the disclosure.

FIG. 16 is a block diagram illustrating a constitution of a base station according to the disclosure.

As illustrated in FIG. 16, the base station includes an RF processor 1p-10, a baseband processor 1p-20, a backhaul communication unit 1p-30, a storage 1p-40, and a controller 1p-50.

The RF processor 1p-10 performs a function for transmitting and receiving a signal through a wireless channel, such as band conversion and amplification of a signal. For example, the RF processor 1p-10 may up-convert a baseband signal provided from the baseband processor 1p-20 into an RF band signal, transmit the RF band signal through an antenna, and down-convert the RF band signal received through the antenna into a baseband signal. For example, the RF processor 1p-10 may include a transmission filter, a reception filter, an amplifier, a mixer, an oscillator, a DAC, an ADC, and the like. In FIG. 16, although only one antenna is illustrated, the first access node may include a plurality of antennas. Further, the RF processor 1p-10 may include a plurality of RF chains. Furthermore, the RF processor 1p-10 may perform beamforming. For the beamforming, the RF processor 1p-10 may adjust a phase and magnitude of each of signals transmitted and received through a plurality of antennas or antenna elements. The RF processor may perform a downlink MIMO operation by transmitting one or more layers.

The baseband processer 1p-20 performs a function of converting a baseband signal and a bit stream according to the physical layer standard of first radio access technology. For example, when transmitting data, by encoding and modulating a transmitted bit stream, the baseband processer 1p-20 generates complex symbols. Further, when receiving data, by demodulating and decoding the baseband signal provided from the RF processer 1p-10, the baseband processer 1p-20 restores a received bit stream. For example, in the case of following the OFDM scheme, when transmitting data, the baseband processer 1p-20 encodes and modulates a transmission bit stream to generate complex symbols, maps the complex symbols to subcarriers, and then forms OFDM symbols through IFFT operation and CP insertion. Further, when receiving data, the baseband processer 1p-20 divides the baseband signal provided from the RF processor 1p-10 into units of an OFDM symbol, restores signals mapped to subcarriers through an FFT operation, and then restores the received bit stream through demodulation and decoding. The baseband processer 1p-20 and the RF processer 1p-10 transmit and receive signals, as described above. Accordingly, the baseband processer 1p-20 and the RF processor 1p-10 may be referred to as a transmitter, a receiver, a transceiver, a communication unit, or a RF unit.

The backhaul communication unit 1p-30 provides an interface for communicating with other nodes in the network. For example, the backhaul communication unit 1p-30 converts a bit string transmitted from a main base station to another node, for example, an auxiliary base station, a core network, and the like into a physical signal, and converts a physical signal received from the other node to a bit string.

The storage 1p-40 stores data such as a basic program, an application program, and configuration information for an operation of the main base station. In particular, the storage 1p-40 may store information on a bearer allocated to an accessed UE, a measurement result reported from the accessed UE, and the like. Further, the storage 1p-40 may store information to be a criterion for determining whether to provide or stop multiple connections to the UE. The storage 1p-40 provides stored data according to a request of the controller 1p-50.

The controller 1p-50 controls overall operations of the main base station. For example, the controller 1p-50 transmits and receives signals through the baseband processer 1p-20 and the RF processer 1p-10 or through the backhaul communication unit 1p-30. Further, the controller 1p-50 writes and reads data in the storage 1p-40. To this end, the controller 1p-50 may include at least one processor.

What is claimed is:

1. A method performed by a terminal in a wireless communication system, the method comprising:

receiving, from a base station, configuration information associated with a multi-universal subscriber identity module (MUSIM), wherein the configuration information includes information on a prohibit timer associated with assistance information reporting for gap preference;

identifying gap preference information;

transmitting, to the base station, assistance information including the gap preference information based on the configuration information, wherein the gap preference information includes a preferred gap length; and receiving, from the base station, a message including gap configuration information for the MUSIM, wherein the gap configuration information for the MUSIM includes information on a gap length.

2. The method of claim 1, further comprising:

starting the prohibit timer based on a transmission of the assistance information including the gap preference information.

3. The method of claim 1, further comprising:

based on a change of the gap preference information, transmitting, to the base station, assistance information not including the gap preference information.

4. The method of claim 1, wherein the gap preference information further includes information indicating a repetition period for a periodic gap and a length of an offset for the periodic gap.

5. The method of claim 1, wherein the gap configuration information for the MUSIM further includes information on a repetition period for a periodic gap and a length of an offset for the periodic gap.

6. The method of claim 1, further comprising:

in case that an aperiodic gap is configured based on the gap configuration information for the MUSIM, identifying that the aperiodic gap is released, based on a time for the gap length being expired.

7. The method of claim 1, wherein, in case that a periodic gap is configured based on the gap configuration information for the MUSIM, the periodic gap is released based on an RRC signaling to release the gap configuration information for the MUSIM.

8. A terminal in a wireless communication system, the terminal comprising:

a transceiver; and a controller configured to:

control the transceiver to receive, from a base station, configuration information associated with a multi-universal subscriber identity module (MUSIM), wherein the configuration information includes information on a prohibit timer associated with assistance information reporting for gap preference, identify gap preference information, and control the transceiver to transmit, to the base station, assistance information including the gap preference information based on the configuration information, wherein the gap preference information includes a preferred gap length, and control the transceiver to receive, from the base station, a message including gap configuration information for the MUSIM, wherein the gap configuration information for the MUSIM includes information on a gap length.

9. The terminal of claim 8, wherein the controller is further configured to start the prohibit timer based on a transmission of the assistance information including the gap preference information.

10. The terminal of claim 8, wherein, based on a change of the gap preference information, the controller is further configured to control the transceiver to transmit, to the base station, assistance information not including the gap preference information.

11. The terminal of claim 8, wherein the gap preference information further includes information indicating a repetition period for a periodic gap and a length of an offset for the periodic gap.

12. The terminal of claim 8, wherein the gap configuration information for the MUSIM further includes information on a repetition period for a periodic gap and a length of an offset for the periodic gap.

13. The terminal of claim 8, wherein, in case that an aperiodic gap is configured based on the gap configuration information for the MUSIM, the controller is further configured to identify that the aperiodic gap is released, based on a time for the gap length being expired.

14. The terminal of claim 8, wherein, in case that a periodic gap is configured based on the gap configuration information for the MUSIM, the periodic gap is released based on an RRC signaling to release the gap configuration information for the MUSIM.

* * * * *